No. 809,045. PATENTED JAN. 2, 1906.
A. M. COBB.
SPRAYING APPARATUS.
APPLICATION FILED DEC. 8, 1904.
2 SHEETS—SHEET 2.
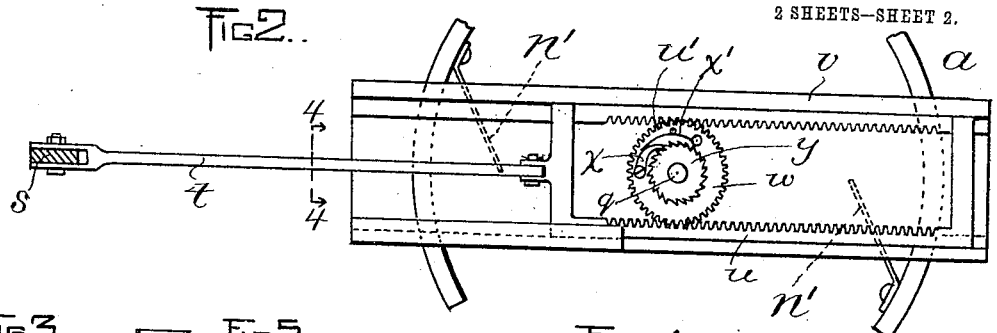
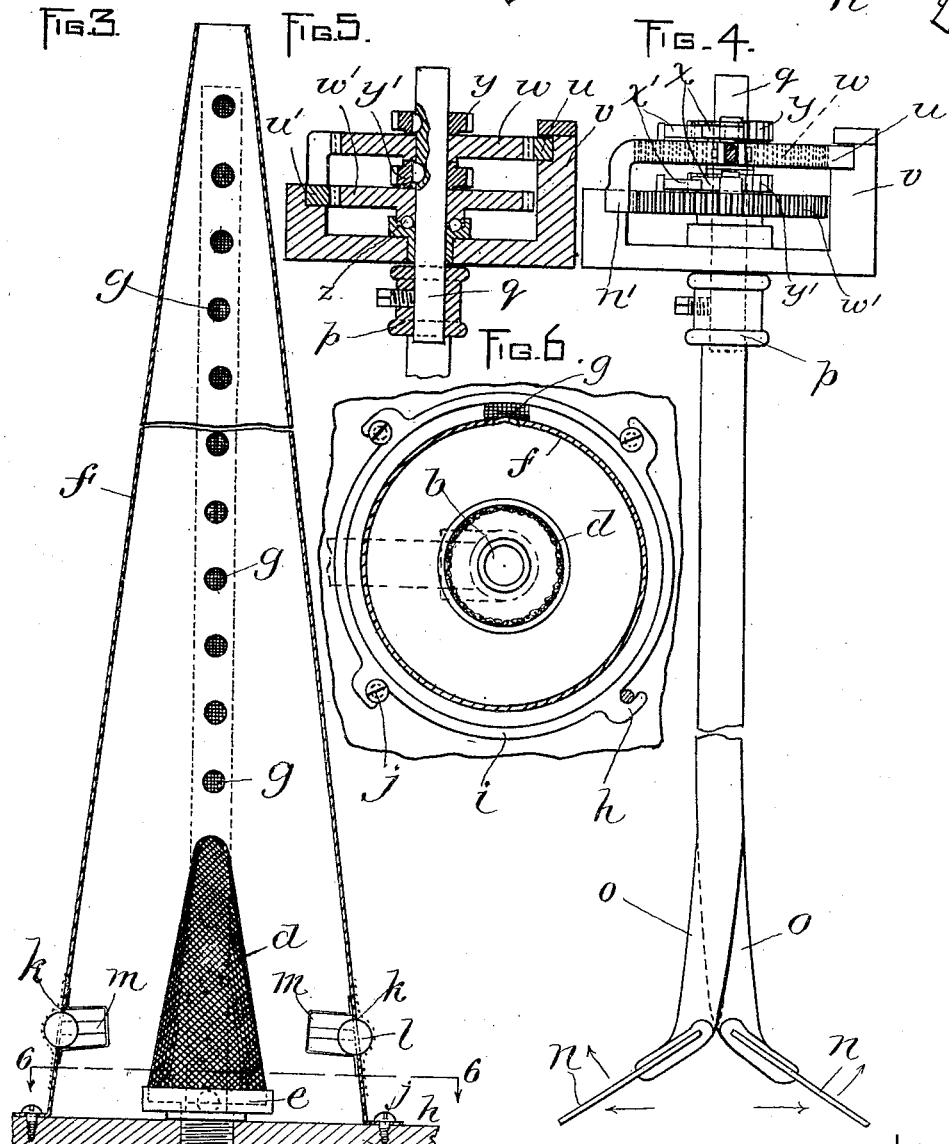
WITNESSES:
P. W. Pezzetti
L. E. Kennedy.
INVENTOR
A. M. Cobb
by Wright Brown Quinby
attys.

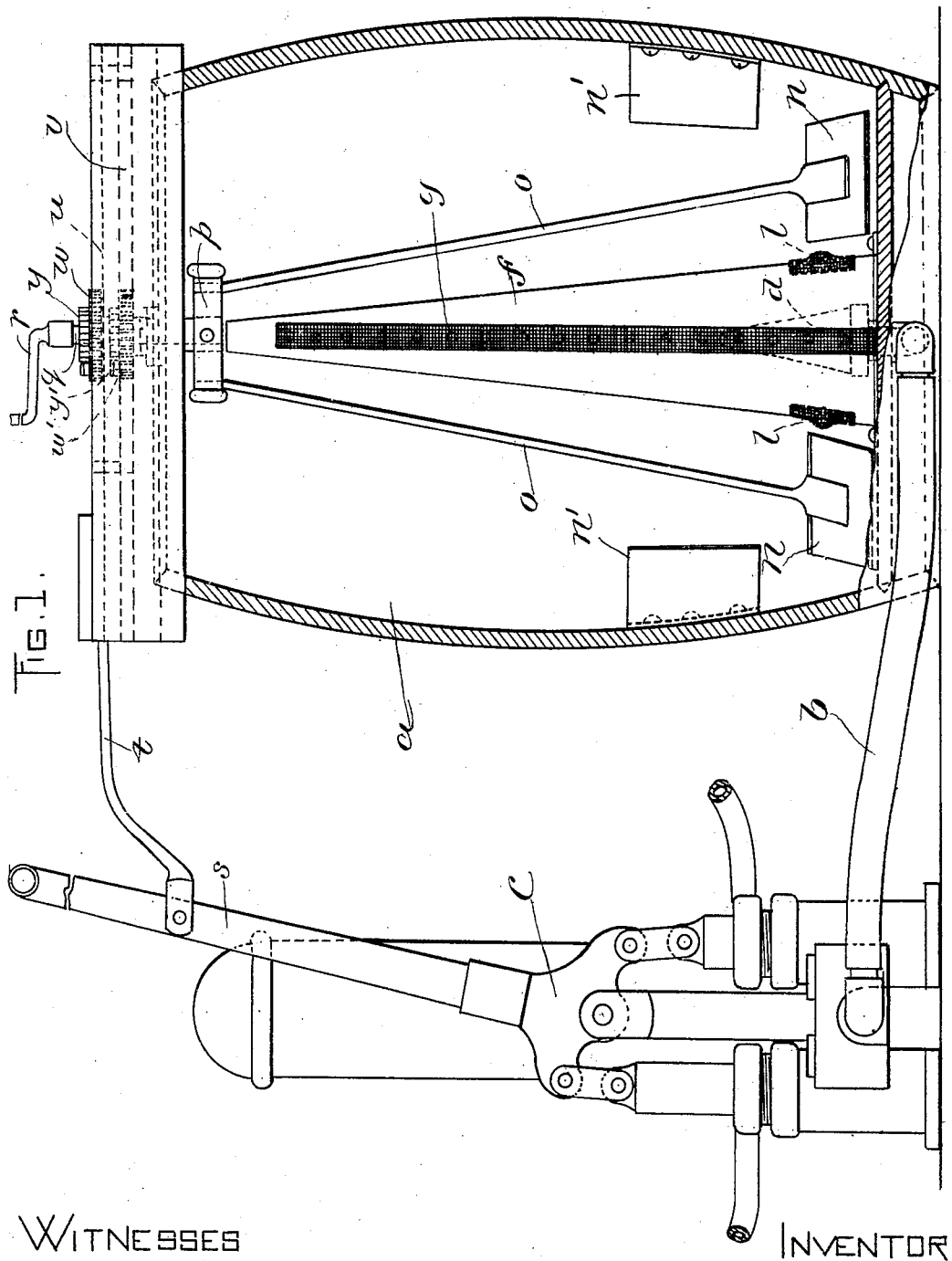

UNITED STATES PATENT OFFICE.

AMORY M. COBB, OF MALDEN, MASSACHUSETTS.

SPRAYING APPARATUS.

No. 809,045.  Specification of Letters Patent.  Patented Jan. 2, 1906.

Application filed December 8, 1904. Serial No. 235,947.

*To all whom it may concern:*

Be it known that I, AMORY M. COBB, of Malden, in the county of Middlesex and State of Massachusetts, have invented certain new and useful Improvements in Spraying Apparatus, of which the following is a specification.

This invention relates to apparatus for throwing an insecticide solution in the form of a spray on trees and shrubbery for destroying vermin, and has for its object to provide a device by which a poisonous composition which is not readily soluble in water may be supplied in a solution of substantially uniform strength until the supply in the containing-receptacle is exhausted.

The invention comprises the apparatus having the novel features which I will now proceed to describe and claim.

Of the accompanying drawings, Figure 1 represents an elevation, partly in section, of my improved spraying apparatus. Fig. 2 represents a plan view of a portion of the same. Fig. 3 represents a vertical central section of a portion of the apparatus. Fig. 4 represents an elevation of the mechanism for stirring the liquid in the containing-receptacle as seen from the line 4 4 of Fig. 2 looking in the direction of the arrow. Fig. 5 represents a section of the operating mechanism for the stirring device. Fig. 6 represents a horizontal section on line 6 6 of Fig. 3.

The same reference characters indicate the same parts in all the figures.

The apparatus comprises a receptacle $a$, which may conveniently be a barrel, although any other form of container will answer, in which is contained a solution of any desired kind of insect-poison. From the lower part of the receptacle a suction-pipe $b$ leads to a pump $c$, by which the solution may be drawn from the receptacle and projected in the form of a spray on the trees, shrubs, &c., which are infested with the insects to be destroyed. The end of the suction-pipe which projects into the receptacle is protected by a strainer $d$, which is here shown as of conical form, having its base clamped to a collar $e$, connected to the pipe. The interior of the receptacle is divided into an inner and outer chamber by means of a partition $f$, which is formed into a tubular shape with its base surrounding the end of the suction-pipe and clamped tightly to the bottom of the receptacle, so that practically none of the liquid can flow beneath it. The tubular member and suction-pipe are preferably located at the center of the receptacle, and the former extends upward toward the top of the receptacle, being preferably perpendicular to the bottom thereof. Although it is not essential that this member should be in the center of the receptacle, it should at least be so placed that there is a space on all sides between it and the sides of the receptacle to permit the location and movement of a stirring device for agitating the liquid surrounding this member. Communication from the outer chamber to the inner is permitted through orifices $g$ in the side walls of the tubular member $f$, arranged at varying distances from the bottom of the receptacle, preferably in vertical lines, and as the solution is drawn from the inner chamber by the pump the supply is maintained by flow of the solution through these orifices. The member $f$ thus constitutes a conduit through which the solution is drawn to supply the suction-pipe $b$ and the pump. The connection between this member and the bottom of the receptacle is made by means of hooks $h$, projecting horizontally from a flange $i$ about the bottom of the conduit and engaging under the heads of screws or studs $j$, projecting from the receptacle-bottom. As the level of liquid in the outer chamber of the receptacle becomes lower the number of orifices in the sides of the conduit through which it may flow becomes progressively less, and it is obvious that in time a point will be reached where the flow through the orifices will be insufficient to supply the solution to the inner chamber as fast as it is taken away by the pump. Accordingly a number of auxiliary openings $k$ intermediate the orifices $g$ are provided near the bottom of the conduit, and these are arranged to be closed when the level is high and to be automatically opened after the level has fallen below a predetermined point.

The closing means consists of balls $l$, which are supported in guides $m$, mounted on the walls of the member $f$ adjacent the openings $k$ on the inside of this member and are slightly inclined, so that the balls tend by gravity to roll into and close the openings. When the receptacle is full of liquid, the solution taken from the inner chamber by the pump is supplied so quickly by the flow through the many orifices $g$ that there is practically no difference of pressure between the inner and outer chambers; but when the level has fallen so that the number of orifices $g$ through which the solution can flow is much reduced the loss from the inner chamber will be only slowly made good through these orifices, and consequently there will be a greater head in the outer chamber than there is within the conduit. This will cause the balls $l$ to be forced backward from the holes $k$, allowing the liquid to flow through these openings, and the inclination of the guides $m$ will be so arranged that the openings $k$ will be called into play at a stage early enough to provide an uninterrupted flow to the pump. Although the valves for closing the openings $k$ are here shown as balls held by gravity against the sides of these openings, it is obvious that other forms of valves may be used and may be held against the sides by springs or by any other appropriate means.

A device for agitating and imparting an upward movement to the liquid in the outer chamber of the receptacle is provided and consists of inclined blades or paddles $n$, located near the bottom of the receptacle and carried by arms $o$, extending downwardly from the cross-arm $p$, connected to a shaft $q$. The latter may be rotated to operate the paddles by means of a crank $r$, or it may be operated simultaneously with the pump by the latter through ratchet-and-pawl mechanisms connected to the pump-handle $s$ or other moving part of the pump. One form of such mechanism consists of a link $t$, pivoted to the pump-handle and to a frame having as parts the rack-bars $u$ and $u'$, held in a guideway $v$ and movable longitudinally therein. One of the rack-bars, as the bar $u$, will be arranged at a different level from the other and meshes with a pinion $w$, loosely mounted on shaft $q$. This pinion carries a pawl $x$, which is caused to engage a ratchet-wheel $y$, keyed to the shaft. The other rack-bar $u'$ meshes with a similar pinion $w'$, having a pawl $x'$, that engages a ratchet $y'$, also keyed to the shaft. These pawls and the teeth of the ratchets will be so arranged that the former will engage the latter on opposite reciprocations of the frame, so that the shaft will be continuously rotated in such a direction as to cause the blades to force streams of the liquid upwardly in helical paths in the space outside of the member $f$. By means of this device the solution is maintained of a uniform strength throughout the whole receptacle, and in cases where a relatively insoluble poisonous composition is used, where perhaps part of the undissolved compound would be lying on the bottom of the receptacle, it is essential that such an agitating means should be provided in order that the solution in the upper part of the receptacle may have the necessary strength. As the orifices $g$ are arranged preferably at equidistant intervals along the height of the conduit $f$ and the auxiliary openings $k$ are normally closed, portions of the solution will be admitted to the inner chamber in equal amounts from all the levels of the receptacle, and this, in connection with the upward movement imparted to the liquid by the stirrers, will secure an almost absolutely even strength of the solution taken by the pump, and it is only when the level has become so low that not sufficient liquid can flow through the orifices $g$ that the auxiliary openings near the bottom of the conduit are open to permit the greater proportion of the solution to flow from their level.

In this embodiment of the invention the partition of which the conduit is made is formed into conical shape; but obviously the shape is not essential, as it might be cylindrical, prismatic, or having upwardly-diverging instead of upwardly-converging sides.

It will be apparent that by the device of my invention a solution of the proper strength and one of which the strength will be maintained constant may be supplied for the purposes hereinbefore indicated.

To prevent the liquid in the receptacle from swirling around horizontally with the blades $n$ $n$, I provide fixed blades $n'$ $n'$, attached to the receptacle and projecting obliquely from the inner wall thereof partly across the space between this wall and the partition $f$. These blades break up the horizontal circular current set up by the blades $n$ $n$ and insure an effective movement of the liquid upwardly from the bottom of the receptacle.

I claim—

1. A spraying apparatus comprising a receptacle having an outlet in its bottom, a conduit extending substantially the entire height of the receptacle attached to the bottom thereof with a liquid-tight connection and opening into said outlet, said conduit having provisions for admitting liquid to its interior simultaneously from the upper portion and a plurality of lower levels of the receptacle, and being separated on all sides from the walls of the receptacle by a space, and a stirring-blade located in such space and revolubly movable about the conduit.

2. A spraying apparatus comprising a receptacle having an outlet in its bottom, a conduit extending substantially the entire height of the receptacle attached to the bottom thereof with a liquid-tight connection and opening into said outlet, said conduit having provisions for admitting liquid to its interior simultaneously from the upper portion and a plurality of lower levels of the receptacle, and being separated on all sides from the walls of the receptacle by a space, a rotary cross-arm mounted above the conduit, a depending arm extending from said cross-arm downward into said space and movable around the conduit, and a stirring-blade secured to the depending arm adjacent the bottom of the receptacle and inclined with respect to the vertical, whereby an upward movement is given to the liquid in the receptacle by movement of the blade.

3. A spraying apparatus comprising a receptacle having an outlet in its bottom, a conduit extending substantially the entire height of the receptacle attached to the bottom thereof with a liquid-tight connection and opening into said outlet, said conduit having provisions for admitting liquid to its interior simultaneously from the upper portion and a plurality of lower levels of the receptacle, and being separated on all sides from the walls of the receptacle by a space, a rotary cross-arm mounted above the conduit, a depending arm extending from said cross-arm downward into said space and movable around the conduit, a stirring-blade secured to the depending arm adjacent the bottom of the receptacle and inclined with respect to the vertical, whereby an upward movement is given to the liquid in the receptacle by movement of the blade, and stationary blades fixed to the walls of the receptacle arranged in vertical planes and projecting obliquely into said space.

4. A spraying apparatus comprising a receptacle having an outlet in its bottom, a conduit extending substantially the entire height of the receptacle attached to the bottom thereof with a liquid-tight connection and opening into said outlet, said conduit having provisions for admitting liquid to its interior simultaneously from the upper portion and a plurality of lower levels of the receptacle, and being separated on all sides from the walls of the receptacle by a space, a stirring-blade located in such space and revolubly movable about the conduit, a pump having a suction-pipe connected with said outlet, and connections between the pump and stirring-blade and operated by the former for revolving the latter about the conduit.

5. A spraying apparatus comprising a receptacle, an outlet-pipe communicating with the lower portion of the receptacle, a tubular member tightly secured to the bottom of the receptacle surrounding the opening of the outlet-pipe extending upwardly therefrom and forming in its interior a chamber separated from the main body of the receptacle, the tubular member being provided with orifices at different distances from the bottom of the receptacle, a strainer within the space inclosed by said tubular member connected to the outlet-pipe and surrounding the opening thereof, and means for imparting an upward movement to the liquid contained in the receptacle surrounding the tubular member.

6. In a spraying apparatus, a receptacle, a partition forming an inclosed space within the receptacle extending from the lower toward the upper portion of the receptacle and separated on all sides from the walls thereof, the said partition being tightly mounted to prevent the inflow of liquid to its interior beneath its lower edge and having openings in its sides arranged at different heights from its bottom, provisions for preventing the flow of liquid through certain of the lower openings until the level of the liquid has fallen below a predetermined point, an outlet-conduit opening into the lower portion of the space inclosed by the partition, and a member arranged in the space between the partition and the walls of the receptacle for agitating the liquid contained in said space.

7. In a spraying apparatus, a receptacle, a partition forming an inclosed space within the receptacle extending from the lower toward the upper portion of the receptacle and separated on all sides from the walls thereof, the said partition being tightly mounted to prevent the inflow of liquid to its interior beneath its lower edge and having openings in its sides arranged at different heights from its bottom, means adapted to close certain of the lowermost openings when the receptacle is full of liquid, and arranged to uncover the same after the level of liquid has fallen to a predetermined point, an outlet-conduit opening into the lower portion of the space inclosed by the partition, and a member arranged in the space between the partition and the walls of the receptacle for agitating the liquid contained in said space.

8. In a spraying apparatus, a receptacle, a partition forming an inclosed space within the receptacle extending from the lower toward the upper portion of the receptacle and separated on all sides from the walls thereof, the said partition being tightly mounted to prevent the inflow of liquid to its interior beneath its lower edge and having openings in its sides arranged at different heights from its bottom, valves arranged in line with certain of the lower openings on the inside of the partition and yieldingly impelled to close said openings, an outlet-conduit opening into the lower portion of the space inclosed by the partition, and a member arranged in the space between the partition and the walls of the receptacle for agitating the liquid contained in said space.

9. In a spraying apparatus, a receptacle, a conduit mounted within the receptacle to extend from the upper to the lower portion thereof, having openings in its sides and mounted with a liquid-tight connection at its lower end, and gravity-operated means for closing certain of said orifices.

10. In a spraying apparatus, a receptacle, a conduit mounted within the receptacle to extend from the upper to the lower portion thereof, having openings in its sides and mounted with a liquid-tight connection at its lower end, a guide connected to the interior of the conduit adjacent one of said orifices and inclined relatively thereto, and a ball supported by said guide.

11. A spraying apparatus comprising a receptacle adapted to contain a solution, a pump, a pipe connected to the pump and leading into the lower part of the receptacle, headed studs mounted on the bottom of the receptacle, a tubular member within the receptacle surrounding the opening of the suction-pipe and extending toward the upper portion of the receptacle, forming an inner chamber separated on all sides from the side walls of the receptacle, the said member being formed with perforations arranged at varying distances from the bottom of the receptacle and connected to the bottom of the receptacle by integral hooks engaging said studs for excluding from the inner chamber all the solution except that which flows through the perforations, and stirring members consisting of blades inclined to the vertical beside the tubular member supported in the lower portion of the space between said member and the side walls of the receptacle and movable in a direction to impart an upward movement to the liquid contained in said space.

12. A spraying apparatus comprising a receptacle, a vertical conduit therein having a series of orifices at different distances from the bottom of the receptacle, said conduit being separated from the inner surface of the receptacle by a space surrounding the conduit, a pump having a suction-pipe communicating with the lower portion of the conduit, means located in the space surrounding the conduit for imparting an upward movement to the liquid contained therein and movable about the conduit, and fixed blades projecting inwardly from the outer wall of said space above the said means, arranged to arrest rotary movement of the liquid.

13. In a spraying apparatus, a receptacle, a tubular member open at its lower end located within the receptacle, extending from the bottom to a point near the top thereof, and separated on all sides from the sides of the receptacle, headed studs mounted on the bottom of the receptacle, and a lateral flange having hooks on the lower portion of the tubular member arranged to be engaged with said studs by rotation of said tubular member and to hold the lower end in liquid-excluding connection with the bottom of the receptacle, the tubular member having perforations in its sides.

14. A spraying apparatus comprising a receptacle, a vertical conduit centrally located therein and having lateral orifices therein, an outlet-pipe extending into the receptacle and the interior of said conduit, a rotary arm mounted in the receptacle above the conduit, and stirring members depending from said arm and movable therewith in the space surrounding the conduit, said stirring members including flat blades inclined forwardly and downwardly with respect to the direction of rotation thereof and adapted to impart an upward movement to the liquid in the receptacle.

15. A spraying apparatus comprising a receptacle, a vertical conduit centrally located therein and having lateral orifices therein, an outlet-pipe extending into the receptacle and the interior of said conduit, a laterally-extending bar mounted in the receptacle above the conduit, means for rotating the bar, arms depending from the ends of said bar into the space surrounding the conduit, and inclined stirring-blades connected to the arms and rotarily movable with said bar.

16. A spraying apparatus comprising a receptacle adapted to contain a solution, a pump having a vibratory handle, a suction-pipe connecting the pump with an outlet in the receptacle, a rotary stirrer located in the receptacle having inclined blades for giving an upward movement to the solution, a vertical spindle connected to said stirrer for rotating the same, two pinions loosely surrounding at different levels said spindle, a horizontal guideway mounted on the top of the receptacle, a frame held, and movable longitudinally, in said guideway consisting of a pair of rack-bars arranged at different levels, one being in mesh with each of said pinions, a ratchet fixed to the spindle adjacent each pinion, pawls carried by the pinions for intermittently engaging the ratchets, and a link connecting said rack-frame with the pump-handle; the racks, pinions and ratchet being so arranged that opposite reciprocations of the frame cause first one and then the other ratchet to be engaged by its respective pawl, whereby the spindle is rotated always in the same direction.

In testimony whereof I have affixed my signature in presence of two witnesses.

AMORY M. COBB.

Witnesses:
A. C. RATIGAN,
C. F. BROWN.